US011946491B2

(12) United States Patent
Tokeshi et al.

(10) Patent No.: US 11,946,491 B2
(45) Date of Patent: Apr. 2, 2024

(54) LIQUID FEEDER

(71) Applicant: Nidec Corporation, Kyoto (JP)

(72) Inventors: Toshihiko Tokeshi, Kyoto (JP); Takahiro Imanishi, Kyoto (JP); Yoshihisa Kitamura, Kyoto (JP); Takehito Tamaoka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 302 days.

(21) Appl. No.: 17/358,066

(22) Filed: Jun. 25, 2021

(65) Prior Publication Data

US 2022/0057123 A1 Feb. 24, 2022

(30) Foreign Application Priority Data

Aug. 21, 2020 (JP) ................................ 2020-140480

(51) Int. Cl.

| | |
|---|---|
| ***F15B 1/24*** | (2006.01) |
| ***F04B 1/02*** | (2006.01) |
| ***F04B 9/02*** | (2006.01) |
| ***F04B 23/02*** | (2006.01) |
| ***F15B 1/04*** | (2006.01) |

(52) U.S. Cl.

CPC .................. *F15B 1/24* (2013.01); *F04B 1/02* (2013.01); *F04B 9/02* (2013.01); *F04B 23/02* (2013.01); *F15B 1/04* (2013.01); *F15B 2201/21* (2013.01); *F15B 2201/31* (2013.01)

(58) Field of Classification Search

CPC .......... F15B 1/04; F15B 2201/31; F15B 1/24; F15B 2201/21; F04B 23/02

See application file for complete search history.

(56) References Cited

U.S. PATENT DOCUMENTS

| | | | | |
|---|---|---|---|---|
| 5,590,936 A * | 1/1997 | Reuter | B60T 8/4291 | 303/119.2 |
| 5,967,623 A * | 10/1999 | Agnew | B60T 8/368 | 303/DIG. 11 |
| 6,652,039 B1 * | 11/2003 | Shull | B60T 8/404 | 303/113.5 |
| 2013/0036728 A1 * | 2/2013 | Billaud | E02F 9/2292 | 60/459 |

FOREIGN PATENT DOCUMENTS

| | | |
|---|---|---|
| JP | 2001087155 A * | 4/2001 |
| JP | 2015-162530 A | 9/2015 |
| JP | 2019-140342 A | 8/2019 |

* cited by examiner

*Primary Examiner* — Atif H Chaudry

(74) *Attorney, Agent, or Firm* — Keating & Bennett, LLP

(57) ABSTRACT

A liquid feeder includes a pump which is prevented from idling, and a replenisher including a cylinder that is a bottomed tube including an opening on a side adjacent to a communication flow path, the opening being connected to the communication flow path, and that is capable of accommodating a liquid in at least a portion of the cylinder, a seal that is housed in the cylinder in a movable manner along the cylinder, and seals the liquid in the cylinder, and a pressurizer to pressurize the seal toward a pump chamber.

9 Claims, 6 Drawing Sheets

LIQUID FEEDER

CROSS-REFERENCE TO RELATED APPLICATIONS

The present application claims priority under 35 U.S.C. § 119 to Japanese Patent Application No. 2020-140480 filed on Aug. 21, 2020, the entire contents of which are hereby incorporated herein by reference.

1. FIELD OF THE INVENTION

The present invention relates to a liquid feeder.

2. BACKGROUND

A liquid feeder that feeds liquid using a pump is used in various apparatuses. In one example, the liquid feeder is used in a cooling apparatus that circulates a refrigerant for cooling a heat source. It is known that when air bubbles are generated in a circulation cooling mechanism using the liquid feeder, heat exchange efficiency decreases.

A conventional liquid cooling device includes an air reservoir to prevent air bubbles in a refrigerant liquid from hindering cooling of an object to be cooled regardless of a gravity direction.

In the conventional liquid cooling device, a liquid may evaporate from a circulation path. This case may cause a liquid near a pump to be insufficient, so that the pump may idle to cause the liquid not to be sufficiently circulated.

SUMMARY

A liquid feeder according to an example embodiment of the present disclosure includes a pump and a replenisher. The pump includes an inflow port into which a liquid flows, an outflow port from which the liquid having flowed in from the inflow port flows out, a communication flow path that communicates between the inflow port and the outflow port, a pump to circulate the liquid, and a pump chamber located midway in the communication flow path and in which the pump is provided. The replenisher includes a cylinder that is a bottomed tube including an opening on a side adjacent to the communication flow path, the opening being connected to the communication flow path, and that is capable of accommodating the liquid in at least a portion of the cylinder, a seal that is housed in the cylinder in a movable manner along the cylinder and seals the liquid in the cylinder, and a pressurizer to pressurize the seal toward the pump chamber.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 6 is a schematic perspective view of the liquid feeder of the second example embodiment, a portion of which is seen through.

DETAILED DESCRIPTION

Figure 1:
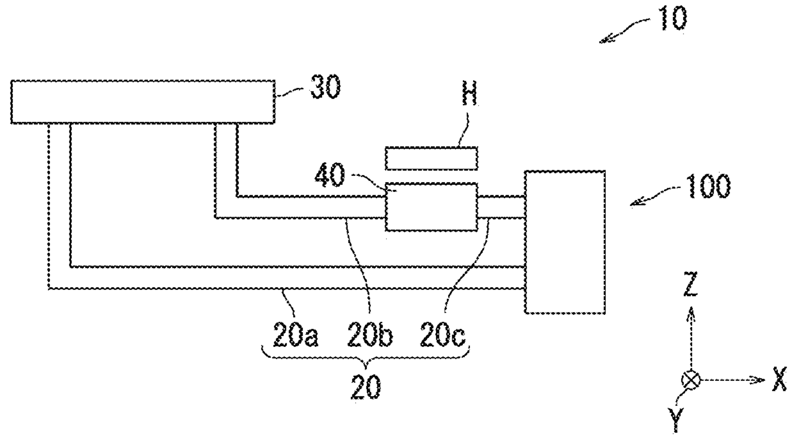
FIG. 1 is a schematic view of a cooling mechanism including a liquid feeder of a first example embodiment of the present disclosure.

Hereinafter, example embodiments of the present disclosure will be described with reference to the accompanying drawings. The same or corresponding parts in the drawings are designated by the same reference numerals, and description thereof will not be duplicated. This specification may describe an X-axis, a Y-axis, and a Z-axis orthogonal to each other to facilitate understanding of the disclosure. Although typically, the Z-axis is parallel to a vertical direction, and the X-axis and the Y-axis are parallel to a horizontal direction, orientations of the X-axis, the Y-axis, and the Z-axis are not limited thereto.

First, a cooling mechanism 10 including a liquid feeder 100 of a first example embodiment will be described with reference to FIG. 1. FIG. 1 is a schematic diagram of the cooling mechanism 10. The cooling mechanism 10 is used for cooling a target apparatus.

The cooling mechanism 10 includes piping 20, a radiator 30, a cold plate 40, and the liquid feeder 100. The cooling mechanism 10 circulates a liquid as a refrigerant. The liquid feeder 100 sequentially feeds the liquid, so that the liquid circulates in the cooling mechanism 10.

The liquid feeder 100, the radiator 30, and the cold plate 40 are connected using the piping 20. The liquid feeder 100 feeds the liquid supplied through the piping 20 toward the radiator 30. The liquid is fed to the radiator 30 through the piping 20 by the liquid feeder 100. The radiator 30 releases heat of the liquid flowing through the piping 20 to the outside, so that the liquid in the piping 20 is cooled.

The cold plate 40 is typically disposed near a heat source H. For example, the cold plate 40 is disposed facing the heat source H. Alternatively, the cold plate 40 may be disposed in contact with the heat source H. When the liquid cooled in the radiator 30 flows to the cold plate 40, heat of the heat source H is transferred through the cold plate 40 and absorbed by the liquid inside. After that, the liquid having passed through the cold plate 40 returns to the liquid feeder 100 and is fed again to the piping 20.

The liquid circulating in the cooling mechanism 10 may be water. Alternatively, the circulating liquid may be a mixed liquid. For example, the mixed liquid may contain water and propylene glycol.

The piping 20 has a tubular shape. For example, the piping 20 is made of resin. In one example, the piping 20 is a rubber tube.

The piping 20 includes a pipe 20*a*, a pipe 20*b*, and a pipe 20*c*. The pipe 20*a* connects the liquid feeder 100 to the radiator 30. The liquid fed from the liquid feeder 100 flows toward the radiator 30 through the pipe 20*a*. The radiator 30 releases heat of the liquid. Thus, the radiator 30 cools the liquid.

The pipe 20*b* connects the radiator 30 to the cold plate 40. The liquid cooled in the radiator 30 flows toward the cold plate 40 through the pipe 20*b*. The liquid absorbs heat from the heat source H in the cold plate 40.

The pipe 20*c* connects the cold plate 40 to the liquid feeder 100. The liquid having absorbed heat in the cold plate 40 flows toward the liquid feeder 100 through the pipe 20*c*. The liquid is pushed out in the liquid feeder 100 and circulated again through the pipe 20*a*, the pipe 20*b*, and the pipe 20*c*.

For example, the cooling mechanism 10 may cool an electronic device provided inside with a heating element. The cooling mechanism 10 may cool a circuit of an electronic device. Alternatively, the cooling mechanism 10 may cool a light source or the like of an electronic device. For example, the electronic device may be any of a server, a projector, a notebook personal computer, and a two-dimensional display device.

As described above, the liquid flows through the piping 20. At this time, the liquid may evaporate through the piping 20. In particular, when a relatively inexpensive rubber tube is used as the piping 20 and the cooling mechanism 10 is used for a long period of time, the liquid gradually evaporates through the piping 20, and then the amount of the liquid circulating through the cooling mechanism 10 may decrease.

Figure 2:
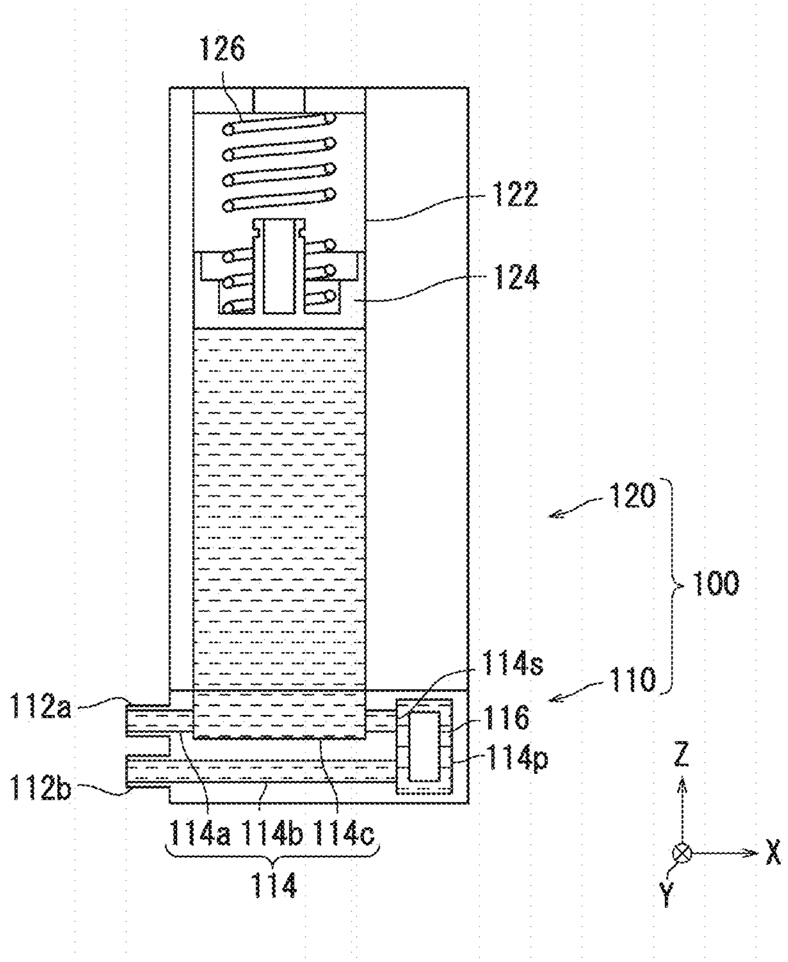
FIG. 2 is a schematic view of the liquid feeder of the first example embodiment.

Next, the liquid feeder 100 of the first example embodiment will be described with reference to FIG. 2. FIG. 2 is a schematic view of the liquid feeder 100.

As illustrated in FIG. 2, the liquid feeder 100 includes a pump mechanism 110 and a replenishment mechanism 120. The pump mechanism 110 feeds a liquid supplied to the pump mechanism 110. The replenishment mechanism 120 supplies the liquid to the pump mechanism 110. The replenishment mechanism 120 is attached to the pump mechanism 110.

The pump mechanism 110 includes an inflow port 112*a*, an outflow port 112*b*, a communication flow path 114, a pump chamber 114*p*, and a pump 116. A liquid flows into the inflow port 112*a*. For example, the pipe 20*c* (FIG. 1) is attached to the inflow port 112*a*. The liquid having flowed in from the inflow port 112*a* flows out from the outflow port 112*b*. The pipe 20*a* (FIG. 1) is attached to the outflow port 112*b*. The communication flow path 114 communicates between the inflow port 112*a* and the outflow port 112*b*. The pump 116 circulates the liquid. The pump chamber 114*p* is located between the inflow port 114 and the outflow port 112*b* of the communication flow path 112*a*. The pump 116 is disposed in the pump chamber 114*p*.

The communication flow path 114 communicates between the inflow port 112*a* and the outflow port 112*b*. The liquid having flowed into the inflow port 112*a* flows through the communication flow path 114 and flows out from the outflow port 112*b*. The pump 116 is disposed in the pump chamber 114*p*. The pump chamber 114*p* is located midway the communication flow path 114. In the present specification, the communication flow path 114 has a section from the inflow port 112*a* to the pump chamber 114*p* that may be referred to as an upstream flow path 114*a*, and the communication flow path 114 has a section from the pump chamber 114*p* to the outflow port 112*b* that may be referred to as a downstream flow path 114*b*.

In the upstream flow path 114*a*, a reservoir 114*c* is disposed. The reservoir 114*c* constitutes a part of the communication flow path 114. The reservoir 114*c* has a cylindrical shape. The reservoir 114*c* has a larger diameter than the upstream flow path 114*a*.

The pump chamber 114*p* includes a suction port 114*s* through which a liquid supplied to the pump 116 is sucked. When the liquid flows into the pump mechanism 110 from the inflow port 112*a*, the liquid flows from the suction port 114*s* to the pump chamber 114*p* through the communication flow path 114. The pump 116 is used for circulating the liquid. The pump 116 feeds the liquid having flowed in from the inflow port 112*a* toward the outflow port 112*b*. The liquid pushed out by the pump 116 flows from the pump chamber 114*p* to the outflow port 112*b* through the communication flow path 114, and flows to the outside from the outflow port 112*b*.

The replenishment mechanism 120 includes a cylinder 122, a seal 124, and a pressurizing assembly 126. The cylinder 122 is a bottomed tubular member having an opening on a side close to the communication flow path 114. The cylinder 122 extends in a Z-axis direction. The opening of the cylinder 122 is connected to the communication flow path 114. The cylinder 122 can store a liquid in at least a part thereof. Specifically, the liquid is stored in the cylinder 122 on a side opposite to the pressurizing assembly 126 across the seal 124.

The cylinder 122 is disposed with the opening of the cylinder 122 communicating with the reservoir 114*c*. Thus, the liquid stored in the cylinder 122 is supplied to the reservoir 114*c*.

Here, the cylinder 122 has an inner diameter (length along an XY plane) that is substantially equal to a diameter of the reservoir 114*c*.

The seal 124 is disposed inside the cylinder 122. The seal 124 is movable along the cylinder 122. The seal 124 seals the liquid in the cylinder 122. The pressurizing assembly 126 pressurizes the seal 124 toward the pump chamber 114*p*.

The liquid feeder 100 of the first example embodiment allows the pressurizing assembly 126 to pressurize the liquid in the cylinder 122 of the replenishment mechanism 120 toward the communication flow path 114 with the seal 124 interposed therebetween in the cylinder 122, so that the inside of the liquid feeder 100 is pressurized. This enables preventing air from being mixed into the liquid feeder 100 when the liquid escapes from the piping 20 or the like. Then, the pump 116 is filled with the liquid, so that idling of the pump 116 can be prevented. In particular, although a device in which the liquid feeder 100 itself changes in attitude may cause air to be accumulated on a side close to the pump 116 depending on the attitude, the liquid feeder 100 of the first example embodiment can maintain a state in which the pump 116 is filled with the liquid even when changing in attitude. Additionally, the communication flow path 114 and the cylinder 122 communicate with each other, so that space can be saved.

The replenishment mechanism 120 supplies the liquid to the pump mechanism 110 between the inflow port 112*a* and the pump chamber 114*p* (upstream flow path 114*a*) of the communication flow path 114. The replenishment mechanism 120 is located upstream of the pump 116, and thus enables delaying decrease in amount of liquid in the pump 116 even when the liquid escapes in the piping (FIG. 1) connected to the liquid feeder 100.

The pressurizing assembly 126 includes a spring disposed between a bottom of the cylinder 122 and the seal 124. Even when the liquid flowing through the liquid feeder 100 gradually evaporates over a long period of time, idling of the pump 116 can be prevented by enabling the inside of the pump 116 to be filled with the liquid using the pressurizing assembly 126. The above-described function can be implemented by using a relatively inexpensive spring as a component of the pressurizing assembly 126.

Examples of the pump 116 include a non-self-contained pump. In this configuration, even when the pump 116 is a non-self-contained pump that does not have self-sufficiency capability, idling can be prevented.

Figure 3:
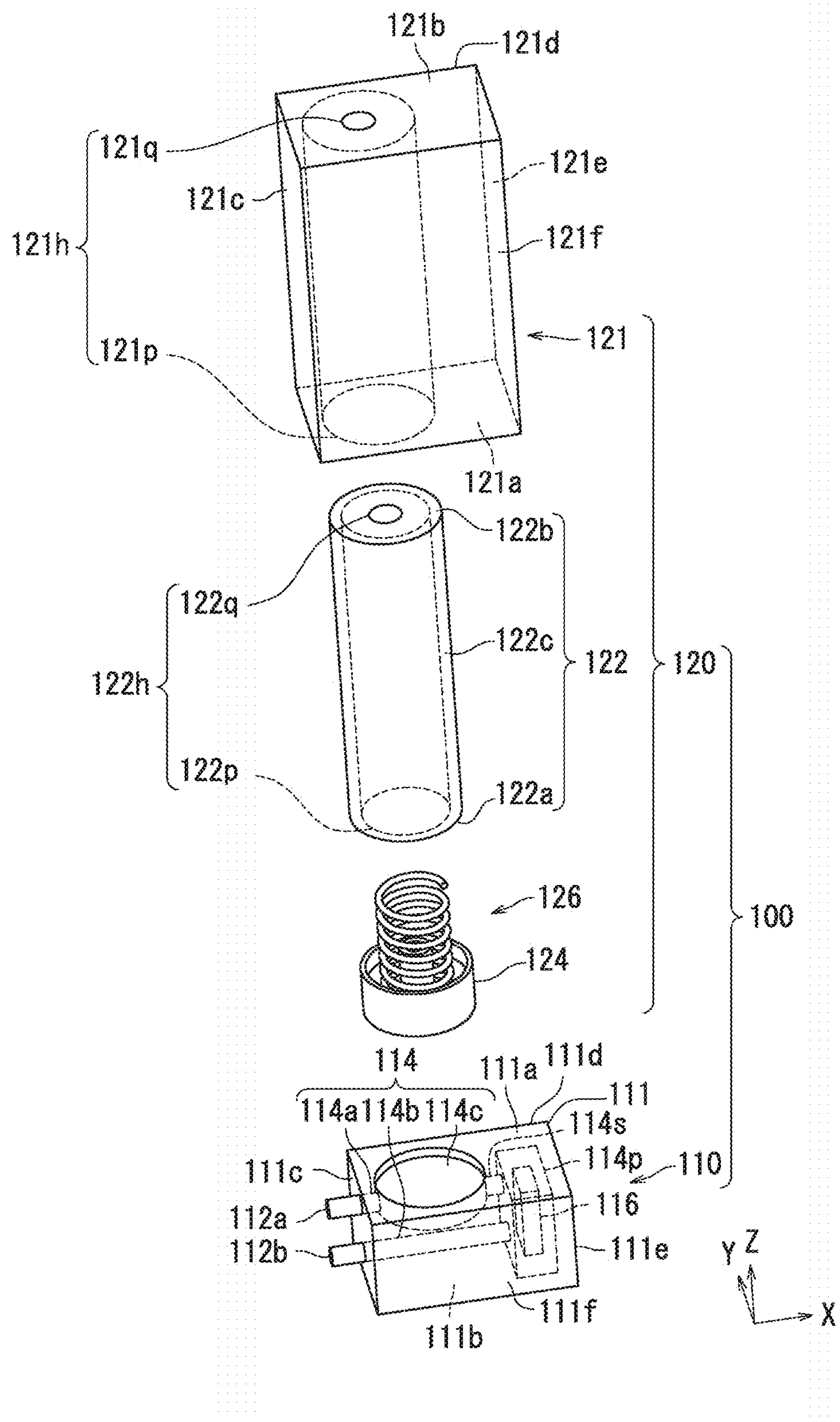
FIG. 3 is a schematic exploded perspective view of the liquid feeder of the first example embodiment.

Next, the liquid feeder 100 of the first example embodiment will be described with reference to FIG. 3. FIG. 3 is a schematic exploded perspective view of the liquid feeder 100.

As illustrated in FIG. 3, the pump mechanism 110 includes a housing 111. The housing 111 has an outer shape that is a substantially rectangular parallelepiped shape except for the inflow port 112*a*, the outflow port 112*b*, and the reservoir 114*c*.

The housing 111 has an upper surface 111*a*, a lower surface 111*b*, a side surface 111*c*, a side surface 111*d*, a side surface 111*e*, and a side surface 111*f*. The upper surface 111*a* is located opposite to the lower surface 111*b*. The side surface 111*c* is located opposite to the side surface 111*e*, and the side surface 111*d* is located opposite to the side surface 111*f*. The upper surface 111*a* is connected to the side surface 111*c*, the side surface 111*d*, the side surface 111*e*, and the side surface 111*f*, and the lower surface 111*b* is connected to the side surface 111*c*, the side surface 111*d*, the side surface 111*e*, and the side surface 111*f*.

The communication flow path 114 is exposed at the upper surface 111*a*. Specifically, the upstream flow path 114*a* of the communication flow path 114 is exposed at the upper surface 111*a*. The replenishment mechanism 120 is installed on the upper surface 111*a*.

The inflow port 112*a* and the outflow port 112*b* are disposed on the side surface 111*c*. Here, the inflow port 112*a* is located closer to the upper surface 111*a* than the outflow port 112*b*, and the outflow port 112*b* is located closer to the lower surface 111*b* than the inflow port 112*a*.

The inflow port 112*a* and the outflow port 112*b* to which the communication flow path 114 is connected are disposed on the side surface 111*c*. The communication flow path 114 is exposed at the upper surface 111*a*, but is not exposed from the lower surface 111*b*, the side surface 111*c*, the side surface 111*d*, the side surface 111*e*, and the side surface 111*f*.

The replenishment mechanism 120 includes a replenishment case 121. The replenishment case 121 has an outer shape that is a substantially rectangular parallelepiped shape except for a through-hole 121*h*. The replenishment case 121 has a lower surface 121*a*, an upper surface 121*b*, a side surface 121*c*, a side surface 121*d*, a side surface 121*e*, and a side surface 121*f*.

The lower surface 121*a* is located opposite to the upper surface 121*b*. The side surface 121*c* is located opposite to the side surface 121*e*, and the side surface 121*d* is located opposite to the side surface 121*f*. The lower surface 121*a* is connected to the side surface 121*c*, the side surface 121*d*, the side surface 121*e*, and the side surface 121*f*, and the upper surface 121*b* is connected to the side surface 121*c*, the side surface 121*d*, the side surface 121*e*, and the side surface 121*f*.

The lower surface 121*a* of the replenishment case 121 faces the upper surface 111*a* of the housing 111.

The lower surface 121*a* is provided with a hole 121*p*. The hole 121*p* extends in the Z-axis direction. The hole 121*p* has a substantially circular shape in XY section. The upper surface 121*b* is provided with a hole 121*q*. The hole 121*q* has a substantially circular shape in XY section. The hole 121*p* of the lower surface 121*a* has a larger hole diameter than the hole 121*q* of the upper surface 121*b*.

The hole 121*p* is connected to the hole 121*q*. Thus, the hole 121*p* and the hole 121*q* form the through-hole 121*h* passing through from the lower surface 121*a* to the upper surface 121*b*. Here, the hole 121*p* is concentric with the hole 121*q*.

The cylinder 122 is inserted into the through-hole 121*h*. As described above, the cylinder 122 is a bottomed tubular member having an opening on a side close to the communication flow path 114.

The cylinder 122 has an outer shape that is a substantially cylindrical shape. The cylinder 122 has a lower surface 122*a*, an upper surface 122*b*, and an outer peripheral surface 122*c*. The lower surface 122*a* is provided with a hole 122*p*. The hole 122*p* extends in the Z-axis direction. The hole 122*p* has a substantially circular shape in XY section. The upper surface 122*b* is provided with a hole 122*q*. The hole 122*q* has a substantially circular shape in XY section. The hole 122*p* of the lower surface 122*a* has a larger hole diameter than the hole 122*q* of the upper surface 122*b*.

The hole 122*p* is connected to the hole 122*q*. Thus, the hole 122*p* and the hole 122*q* form a through-hole 122*h* passing through from the lower surface 122*a* to the upper surface 122*b*. Here, the hole 122*p* is concentric with the hole 122*q*.

The lower surface 122*a* and the upper surface 122*b* of the cylinder 122 each have an outer diameter (length along the XY plane) that is smaller than a diameter of the hole 121*p* of the through hole 121*h* of the replenishment case 121 and larger than a diameter of the hole 121*q*. Thus, the cylinder 122 is inserted into the through-hole 121*h* of the replenishment case 121 and attached to the through-hole 121*h*.

Even when the cylinder 122 is inserted into the through-hole 121*h* of the replenishment case 121, the lower surface 121*a* and the upper surface 121*b* of the replenishment case 121 still communicate with each other due to the hole 121*p*, the hole 122*p*, the hole 122*q*, and the hole 121*q*.

The hole 122*q* is opened in the upper surface 122*b* of the cylinder 122. The hole 121*q* is also opened in the upper surface 121*b* of the replenishment case 121. This enables air pressure near the pressurizing assembly 126 of the cylinder 122 to be equal to the atmospheric pressure. Thus, even when the amount of liquid flowing through communication flow path 114 decreases, the cylinder 122 can be prevented from having negative pressure on its side close to the pressurizing assembly 126.

Although FIGS. 2 and 3 each illustrate the spring (coil spring) as an example of the pressurizing assembly 126, the present example embodiment is not limited thereto. The pressurizing assembly 126 may be a gas supply unit.

In this case, when the pressurizing assembly 126 supplies gas to the seal 124, the seal 124 that seals the liquid in the cylinder 122 can be pressurized.

Although the cooling mechanism 10 illustrated in FIG. 1 includes one radiator 30, the cooling mechanism 10 may include two or more radiators.

Although the liquid feeder 100 illustrated in FIGS. 2 and 3 includes the replenishment mechanism 200 having one cylinder 122, the replenishment mechanism 200 may have two or more cylinders.

Figure 4:
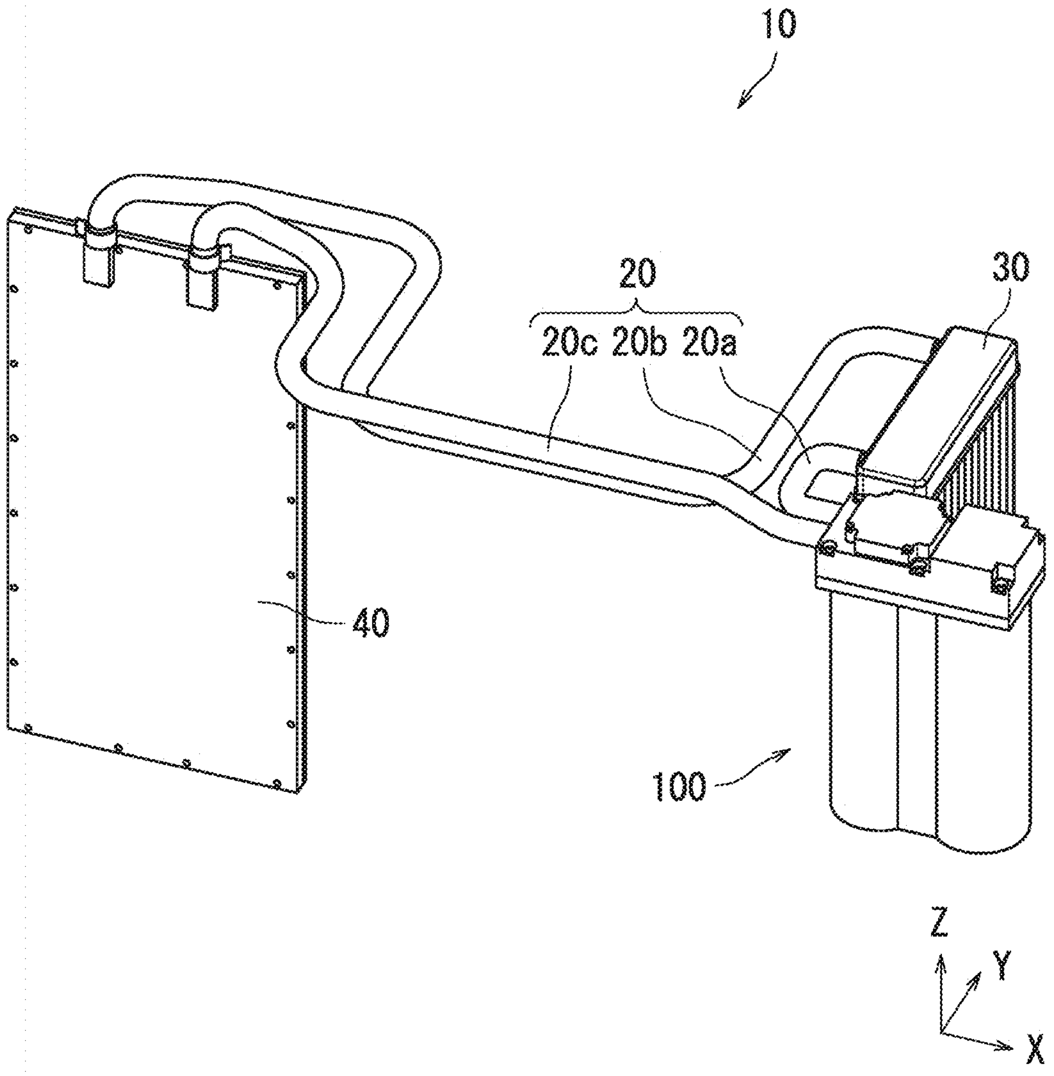
FIG. 4 is a schematic view of a cooling mechanism having a liquid feeder of a second example embodiment of the present disclosure.

Next, a cooling mechanism 10 including a liquid feeder 100 of a second example embodiment will be described with reference to FIG. 4. FIG. 4 is a schematic perspective view of the cooling mechanism 10. In the cooling mechanism 10 of FIG. 4, duplicate description of the cooling mechanism 10 of FIG. 1 is eliminated to avoid redundancy.

As illustrated in FIG. 4, the cooling mechanism 10 includes piping 20, a radiator 30, a cold plate 40, and the liquid feeder 100. The cooling mechanism 10 circulates a liquid as a refrigerant.

The liquid feeder 100 sequentially feeds the liquid, so that the liquid circulates in the cooling mechanism 10.

The liquid feeder 100, the radiator 30, and the cold plate 40 are connected using the piping 20. The liquid feeder 100 feeds the liquid supplied through the piping 20 toward the radiator 30. The liquid is fed to the radiator 30 through the piping 20 by the liquid feeder 100. The radiator 30 releases heat of the liquid flowing through the piping 20 to the outside, so that the liquid in the piping 20 is cooled.

The cold plate 40 is typically disposed near a heat source. For example, the cold plate 40 is disposed opposite to the heat source. Alternatively, the cold plate 40 may be disposed in contact with the heat source. When the liquid cooled in the radiator 30 flows to the cold plate 40, heat of the heat source is transferred through the cold plate 40 and absorbed by the liquid inside. After that, the liquid having passed through the cold plate 40 returns to the liquid feeder 100 and is fed again to the piping 20.

The piping 20 includes a pipe 20*a*, a pipe 20*b*, and a pipe 20*c*. The pipe 20*a* connects the liquid feeder 100 to the radiator 30. The liquid fed from the liquid feeder 100 flows toward the radiator 30 through the pipe 20*a*. The radiator 30 releases heat of the liquid. Thus, the radiator 30 cools the liquid.

The pipe 20*b* connects the radiator 30 to the cold plate 40. The liquid cooled in the radiator 30 flows toward the cold plate 40 through the pipe 20*b*. The liquid absorbs heat from the heat source in the cold plate 40.

The pipe 20*c* connects the cold plate 40 to the liquid feeder 100. The liquid having absorbed heat in the cold plate 40 flows toward the liquid feeder 100 through the pipe 20*c*. The liquid is pushed out in the liquid feeder 100 and circulated again through the pipe 20*a*, the pipe 20*b*, and the pipe 20*c*.

Next, the liquid feeder 100 of the second example embodiment will be described with reference to FIGS. 5 to 7.

Figure 5:
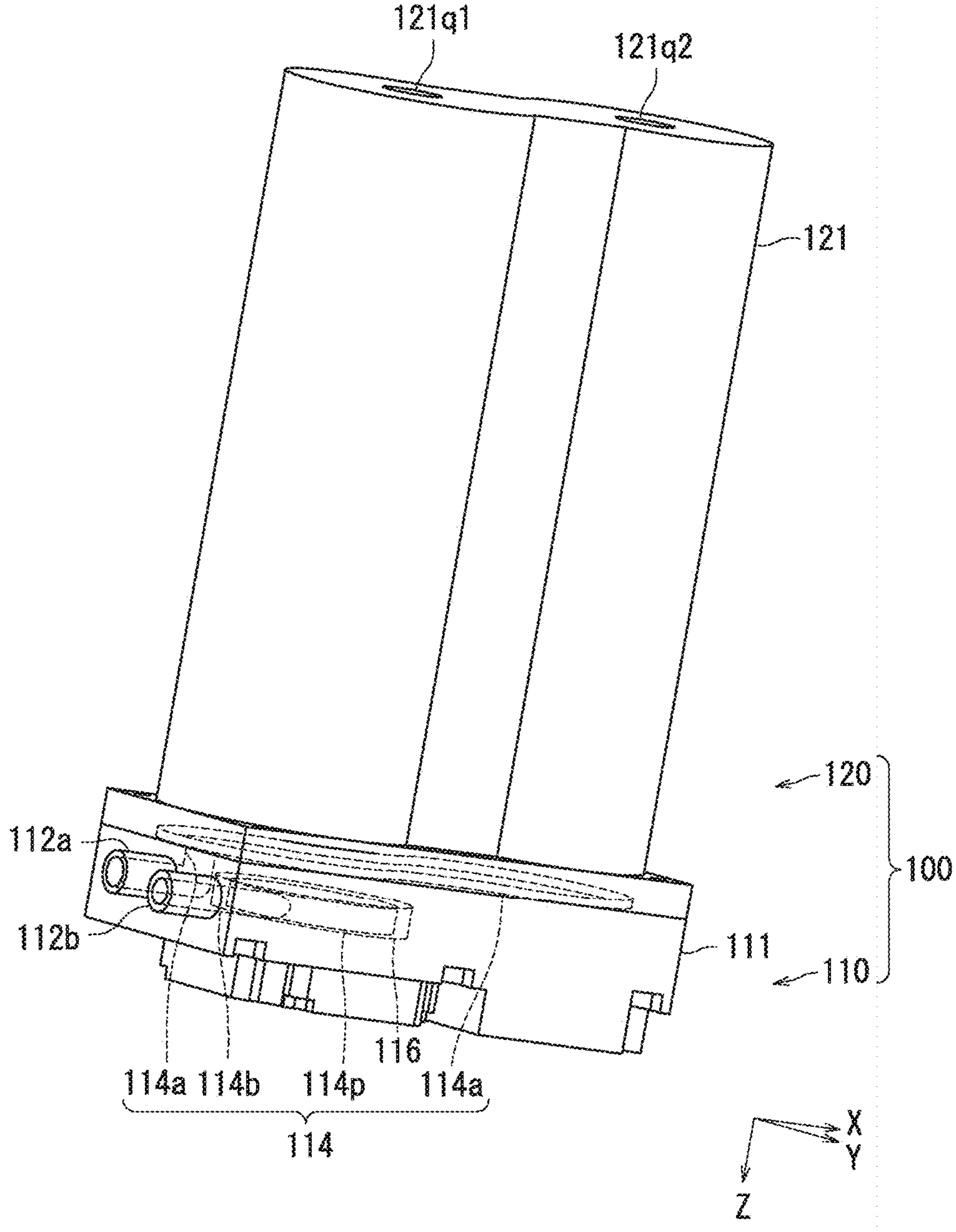
FIG. 5 is a schematic perspective view of the liquid feeder of the second example embodiment.

FIG. 5 is a schematic perspective view of the liquid feeder 100. FIG. 6 is a schematic perspective view of the liquid feeder 100 of FIG. 5, a part of which is seen through. FIG. 7 is a schematic exploded perspective view of the liquid feeder 100. In the liquid feeder 100 of FIGS. 5 to 7, duplicate description of the liquid feeder 100 described above with reference to FIGS. 2 and 3 will be eliminated to avoid redundancy.

Figure 6:
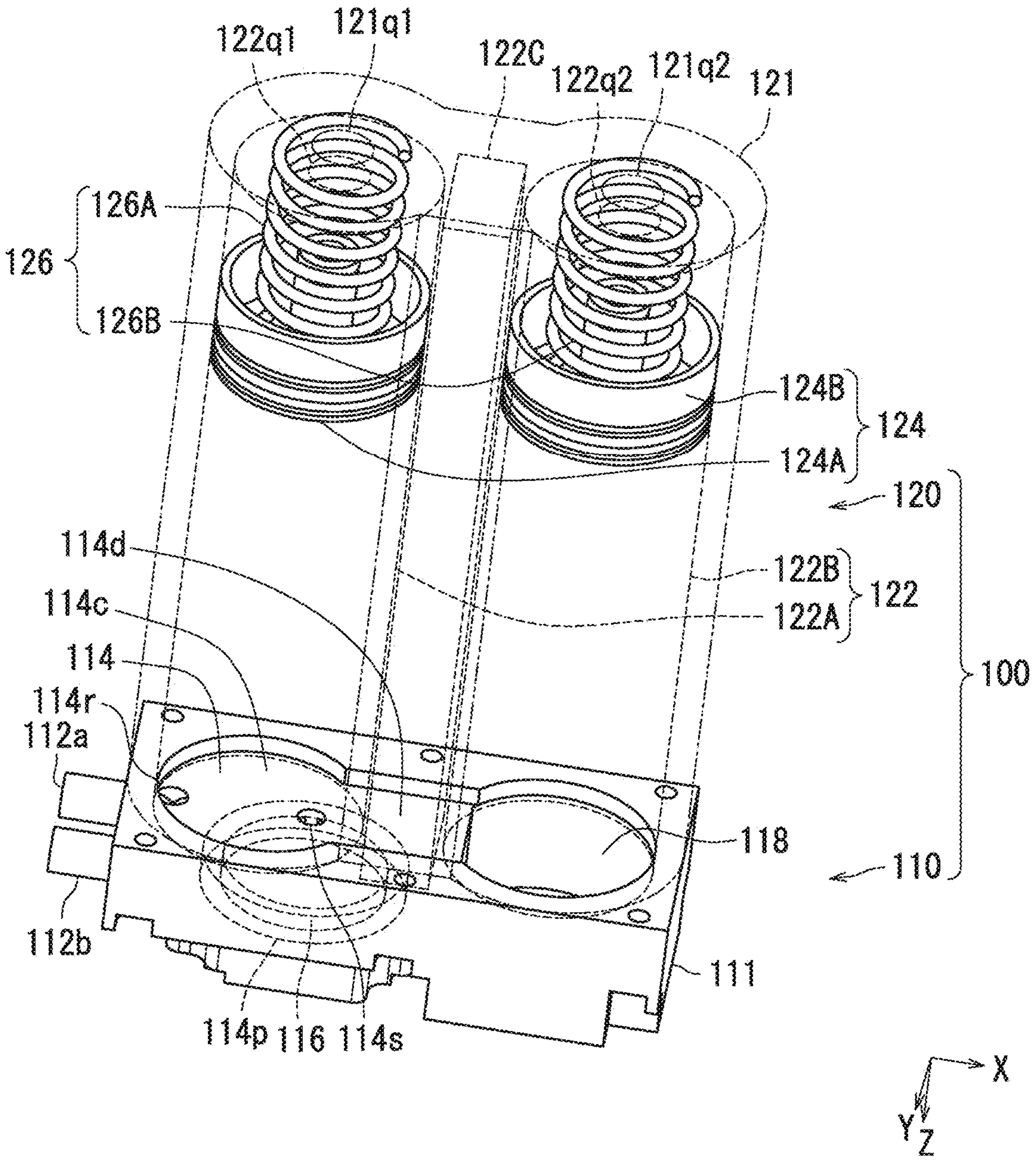
Figure 7:
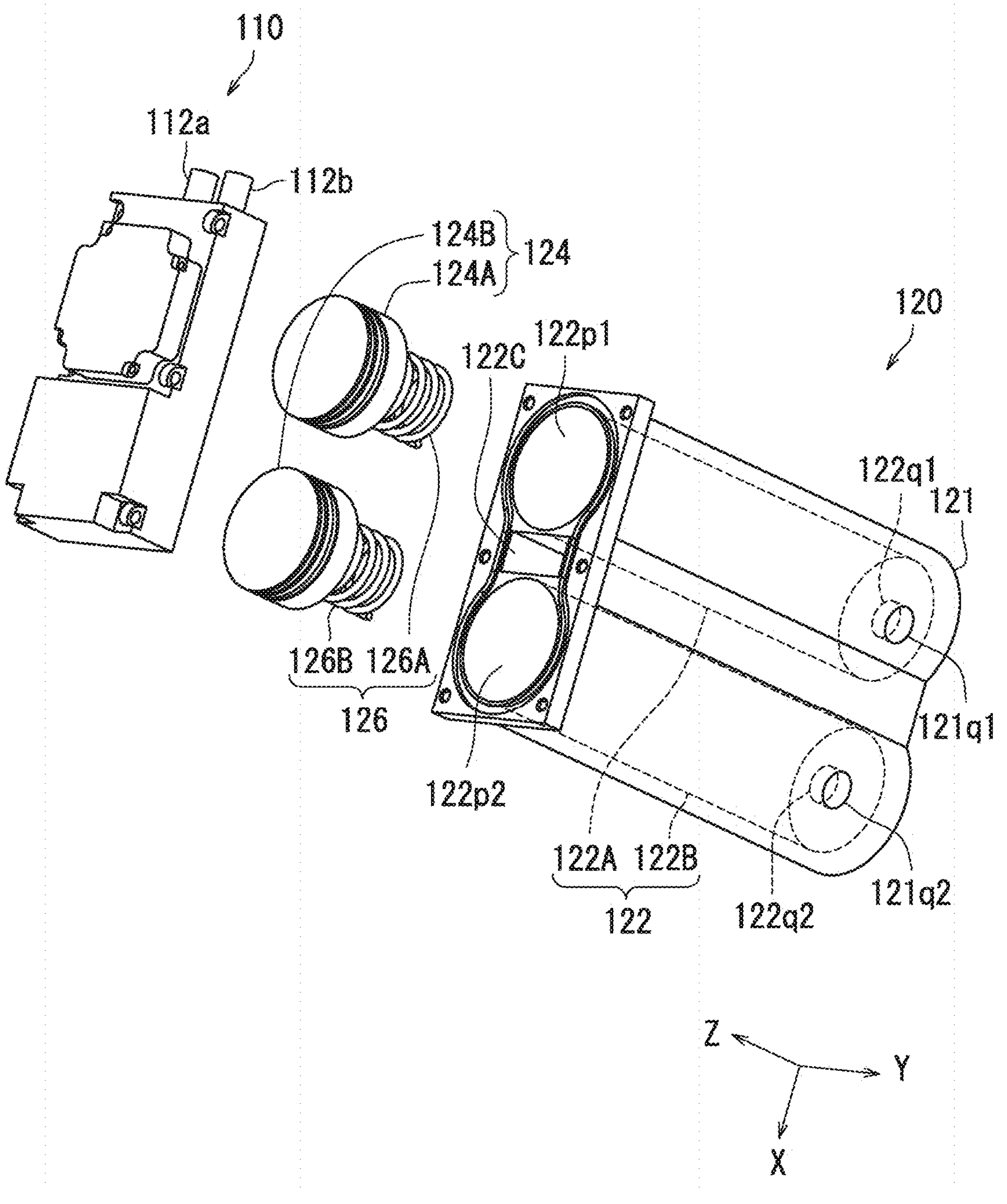
FIG. 7 is a schematic exploded perspective view of the liquid feeder of the second example embodiment.

As illustrated in FIGS. 5 to 7, the liquid feeder 100 includes a pump mechanism 110 and a replenishment mechanism 120. The pump mechanism 110 feeds a liquid. The replenishment mechanism 120 supplies the liquid to the liquid feeder 100. The replenishment mechanism 120 is attached to the pump mechanism 110.

A liquid flows into the inflow port 112*a*. The liquid having flowed in from the inflow port 112*a* flows out from the outflow port 112*b*. The liquid having flowed into the inflow port 112*a* flows through the communication flow path 114 and flows out from the outflow port 112*b*. The pump 116 is disposed in the pump chamber 114*p*. The pump chamber 114*p* is located midway the communication flow path 114.

The communication flow path 114 communicates between the inflow port 112*a* and the outflow port 112*b*. The pump 116 circulates the liquid. The pump chamber 114*p* is located between the inflow port 114 and the outflow port 112*b* of the communication flow path 112*a*. The pump 116 is disposed in the pump chamber 114*p*. The pump 116 is used for circulating the liquid.

As illustrated in FIG. 6, the liquid having flowed in from the inflow port 112*a* passes through the communication flow path 114 in the housing 111, and flows to a reservoir 114*c* through a communication port 114*r*. The reservoir 114*c* is a hole in a circular cylinder shape.

The pump chamber 114*p* includes a suction port 114*s* through which a liquid supplied to the pump 116 is sucked. The suction port 114*s* is located in the reservoir 114*c*. The suction port 114*s* faces the replenishment mechanism 120 using the communication flow path 114. As described above, the suction port 114*s* of the pump chamber 114*p* faces the replenishment mechanism 120. Thus, even when the liquid feeder 100 changes in attitude due to insufficient pressurization of a pressurizing assembly 126, a state without the liquid in the suction port 114*s* of the pump chamber 114*p* can be prevented.

The liquid feeder 100 further includes an auxiliary tank 118. Here, the auxiliary tank 118 is disposed in the pump mechanism 110. The auxiliary tank 118 is connected to an upstream flow path 114*a* and is adjacent to the pump chamber 114*p*. When the auxiliary tank 118 is adjacent to the pump chamber 114*p*, idling of the pump 116 can be prevented in a space-saving manner.

Specifically, the auxiliary tank 118 is connected to the reservoir 114*c* through a connecting portion 114*d*.

The connecting portion 114*d* is a hole extending in an X-axis direction. Here, the connecting portion 114*d* has a depth (length in the Z-axis direction) that is substantially equal to a depth (length in the Z-axis direction) of the reservoir 114*c*. In contrast, the auxiliary tank 118 has a depth (length in the Z-axis direction) that is larger than a depth (length in the Z-axis direction) of each of the reservoir 114*c* and the connecting portion 114*d*. The auxiliary tank 118 enables circulation of the liquid to be continued without idling the pump 116 even with a relatively large amount of evaporation of the liquid.

A cylinder 122 includes a first cylinder 122A and a second cylinder 122B. The first cylinder 122A faces the upstream flow path 114*a* of the communication flow path 114. The second cylinder 122B faces the auxiliary tank 118.

The first cylinder 122A is a bottomed tubular member having an opening on a side close to the communication flow path 114. The opening of the first cylinder 122A is connected to the communication flow path 114. The first cylinder 122A can store a liquid in at least a part thereof.

The first cylinder 122A is provided inside with a first seal 124A and a first pressurizing assembly 126A. The first seal 124A is movable along the first cylinder 122A. The first seal 124A seals the liquid in the first cylinder 122A. The first pressurizing assembly 126A pressurizes the first seal 124A toward the pump chamber 114*p*. The first cylinder 122A faces the upstream flow path 114*a* of the communication flow path 114.

The second cylinder 122B is a bottomed tubular member having an opening on a side close to the communication flow path 114. The opening of the second cylinder 122B is connected to the communication flow path 114. The second cylinder 122B can store a liquid in at least a part thereof.

The second cylinder 122B is provided inside with a second seal 124B and a second pressurizing assembly 126B. The second seal 124B is movable along the second cylinder 122B. The second seal 124B seals the liquid in the second cylinder 122B. The second pressurizing assembly 126B pressurizes the second seal 124B toward the pump chamber 114*p*. The second cylinder 122B faces the auxiliary tank 118 of the communication flow path 114.

The first cylinder 122A and the second cylinder 122B each can store a liquid. Thus, even when decrease in amount of liquid is relatively large, prevention of idling of the pump 116 can be continued.

The replenishment mechanism 120 includes a replenishment case 121 that accommodates the first cylinder 122A, the second cylinder 122B, and an additional tank 122C. The additional tank 122C is located between the first cylinder 122A and the second cylinder 122B. The liquid feeder 100 can be configured by assembling the pump mechanism 110 and the replenishment mechanism 120.

As illustrated in FIG. 7, the first cylinder 122A is provided in its bottom surface close to the pump mechanism 110 with a hole 122*p*1, and in its opposite bottom surface with a hole 122*q*1. The hole 122*q*1 of the first cylinder 122A communicates with a hole 121*q*1 of the replenishment case 121.

The second cylinder 122B is provided in its bottom surface close to the pump mechanism 110 with a hole 122*p*2, and in its opposite bottom surface with a hole 122*q*2. The hole 122*q*2 of the second cylinder 122B communicates with a hole 121*q*2 of the replenishment case 121.

The hole 122*q*1 is opened in the first cylinder 122A and the hole 121*q*1 is also opened in the replenishment case 121, so that air pressure of the first pressurizing assembly 126A of the cylinder 122 can be equal to the atmospheric pressure. Thus, even when the amount of liquid flowing through communication flow path 114 decreases, the first cylinder 122A can be prevented from having negative pressure on its side close to the first pressurizing assembly 126A. Similarly, the hole 122*q*2 is opened in the second cylinder 122B and the hole 121*q*2 is also opened in the replenishment case 121, so that air pressure of the second pressurizing assembly 126B of the cylinder 122 can be equal to the atmospheric pressure. Thus, even when the amount of liquid flowing through communication flow path 114 decreases, the second cylinder 122B can be prevented from having negative pressure on its side close to the second pressurizing assembly 126B.

Although in the above description with reference to FIG. 1, the liquid feeder 100 is used as a part of the cooling mechanism 10, the present example embodiment is not limited thereto. The liquid feeder 100 may be used for a circulation mechanism other than the cooling mechanism 10.

The example embodiments of the present disclosure are described above with reference to the drawings. However, the present disclosure is not limited to the above example embodiments, and can be implemented in various aspects without departing from range of the gist of the present disclosure. Additionally, the plurality of components disclosed in the above example embodiments can be appropriately modified. For example, one component of all components shown in one example embodiment may be added to a component of another example embodiment, or some components of all components shown in one example embodiment may be eliminated from the one example embodiment.

The drawings schematically illustrate each component mainly to facilitate understanding of the disclosure, and thus each illustrated component may be different in thickness, length, number, interval, or the like from actual one for convenience of creating the drawings. The configuration of each component described in the above example embodiments is an example, and is not particularly limited. Thus, it is needless to say that various modifications can be made without substantially departing from range of effects of the present disclosure.

The present disclosure is suitably used for a liquid feeder.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A liquid feeder comprising:
a pump; and
a replenisher; wherein
the pump includes:
an inflow port into which a liquid flows;
an outflow port from which the liquid having flowed in from the inflow port flows out;
a communication flow path that communicates between the inflow port and the outflow port;
a pump to circulate the liquid; and
a pump chamber located midway in the communication flow path and in which the pump is provided;
the replenisher includes:
a cylinder that is a bottomed tube including an opening on a side adjacent to the communication flow path, the opening being connected to the communication flow path, and that is capable of accommodating the liquid in at least a portion of the cylinder;
a seal that is housed in the cylinder in a movable manner along the cylinder, and seals the liquid in the cylinder; and
a pressurizer to pressurize the seal toward the pump chamber, the pressurizer being movable in a pressurizing direction;
the pump chamber includes a suction port through which the liquid to be supplied to the pump is suctioned; and
the suction port opposes the replenisher in the pressurizing direction.

2. The liquid feeder according to claim 1, wherein the pressurizer includes a spring between a bottom of the cylinder and the seal.

3. The liquid feeder according to claim 2, wherein a hole is opened in the bottom of the cylinder.

4. The liquid feeder according to claim 1, further comprising an auxiliary tank that is connected to an upstream flow path located between the inflow port and the pump chamber in the communication flow path and is adjacent to the pump chamber.

5. The liquid feeder according to claim 4, wherein the cylinder includes:
a first cylinder opposing the upstream flow path in the communication flow path; and
a second cylinder opposing the auxiliary tank.

6. The liquid feeder according to claim 5, wherein the replenisher further includes a replenishment case that accommodates the first cylinder, the second cylinder, and an additional tank located between the first cylinder and the second cylinder.

7. The liquid feeder according to claim 1, wherein the replenisher replenishes the liquid to the pump between the inflow port and the pump chamber in the communication flow path.

8. The liquid feeder according to claim 1, wherein
the suction port opposes the replenisher using the communication flow path.

9. The liquid feeder according to claim 1, wherein the pump is a non-self-contained pump.

* * * * *